| (12) | United States Patent | (10) Patent No.: | US 9,077,045 B2 |
|---|---|---|---|
| | Suguro et al. | (45) Date of Patent: | Jul. 7, 2015 |

(54) SECONDARY BATTERY

(75) Inventors: Masahiro Suguro, Tokyo (JP); Daisuke Kawasaki, Tokyo (JP); Midori Shimura, Tokyo (JP); Kazuaki Matsumoto, Tokyo (JP); Yoko Hashizume, Tokyo (JP)

(73) Assignee: NEC CORPORATION, Tokyo (JP)

( * ) Notice: Subject to any disclaimer, the term of this patent is extended or adjusted under 35 U.S.C. 154(b) by 81 days.

(21) Appl. No.: 13/820,239

(22) PCT Filed: Aug. 26, 2011

(86) PCT No.: PCT/JP2011/069302
§ 371 (c)(1),
(2), (4) Date: Mar. 1, 2013

(87) PCT Pub. No.: WO2012/029653
PCT Pub. Date: Mar. 8, 2012

(65) Prior Publication Data
US 2013/0183576 A1  Jul. 18, 2013

(30) Foreign Application Priority Data

Sep. 2, 2010 (JP) ................................. 2010-196624

(51) Int. Cl.
*H01M 4/58* (2010.01)
*H01M 4/36* (2006.01)
*H01M 10/0568* (2010.01)
(Continued)

(52) U.S. Cl.
CPC ........ *H01M 10/0568* (2013.01); *Y02T 10/7011* (2013.01); *H01M 4/133* (2013.01); *H01M 4/134* (2013.01); *H01M 10/052* (2013.01); *H01M 10/0567* (2013.01); *H01M 2/0287* (2013.01); *H01M 4/622* (2013.01); *Y02E 60/122* (2013.01); *H01M 4/131* (2013.01); *H01M 4/139* (2013.01); *H01M 4/625* (2013.01)

(58) Field of Classification Search
None
See application file for complete search history.

(56) References Cited

U.S. PATENT DOCUMENTS

2002/0094479 A1* 7/2002 Gan et al. ...................... 429/212
2002/0122988 A1* 9/2002 Hamamoto et al. ........... 429/340
(Continued)

FOREIGN PATENT DOCUMENTS

| JP | 6-325765 A | 11/1994 |
|---|---|---|
| JP | 2000-149986 A | 5/2000 |

(Continued)

OTHER PUBLICATIONS

International Search Report for PCT/JP2011/069302 dated Nov. 29, 2011.

*Primary Examiner* — Cynthia K Walls
(74) *Attorney, Agent, or Firm* — Sughrue Mion, PLLC

(57) ABSTRACT

An object is to provide a higher-performance secondary battery, particularly to provide a secondary battery having a low impedance. The present exemplary embodiment is a secondary battery comprising an electrode assembly in which a positive electrode and a negative electrode are arranged to face each other, an electrolyte liquid, and a package accommodating the electrode assembly and the electrolyte liquid, wherein the negative electrode includes a negative electrode active substance containing at least one selected from a metal (a) capable of being alloyed with lithium, and a metal oxide (b) capable of occluding and releasing lithium ions, a negative electrode binder, and a negative electrode current collector; and the electrolyte liquid contains a sulfide compound.

15 Claims, 1 Drawing Sheet

(51) Int. Cl.

| | |
|---|---|
| *H01M 4/133* | (2010.01) |
| *H01M 4/134* | (2010.01) |
| *H01M 10/052* | (2010.01) |
| *H01M 10/0567* | (2010.01) |
| *H01M 2/02* | (2006.01) |
| *H01M 4/62* | (2006.01) |
| *H01M 4/131* | (2010.01) |
| *H01M 4/139* | (2010.01) |

(56) References Cited

U.S. PATENT DOCUMENTS

2003/0049527 A1* 3/2003 Yageta et al. ............... 429/179
2003/0215711 A1* 11/2003 Aramata et al. ............ 429/218.1
2005/0042521 A1 2/2005 Hamamoto et al.
2007/0141475 A1* 6/2007 Ahn et al. ................... 429/326

FOREIGN PATENT DOCUMENTS

| JP | 2002-280065 A | 9/2002 |
| JP | 2003-77533 A | 3/2003 |
| JP | 2003-123740 A | 4/2003 |
| JP | 2004-31244 A | 1/2004 |
| JP | 2004-47404 A | 2/2004 |
| JP | 2007-197370 A | 8/2007 |
| JP | 2009-152037 A | 7/2009 |
| JP | 2010-186751 A | 8/2010 |

* cited by examiner

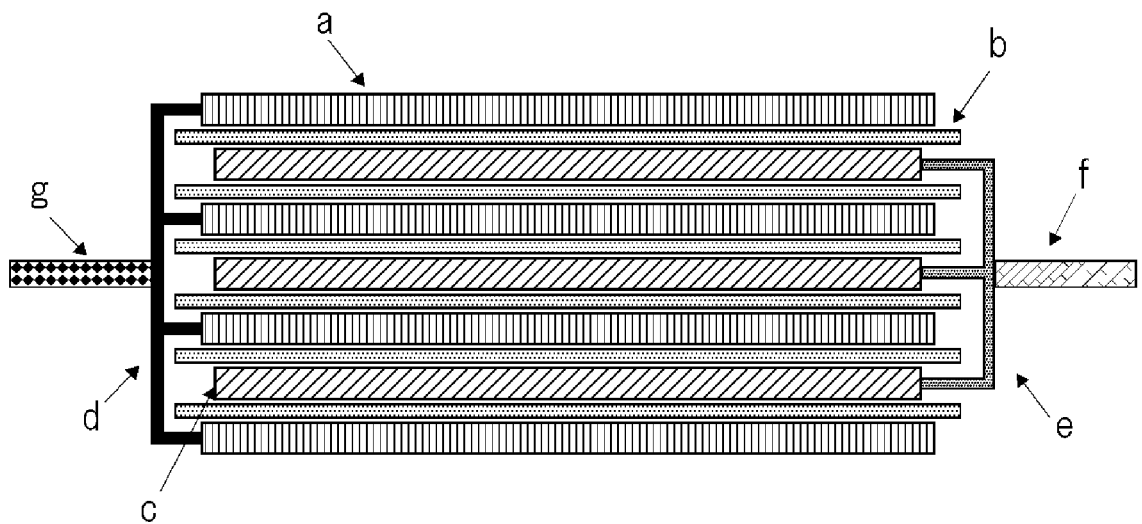

SECONDARY BATTERY

CROSS REFERENCE TO RELATED APPLICATIONS

This application is a National Stage of International Application No. PCT/JP2011/069302 filed Aug. 26, 2011, claiming priority based on Japanese Patent Application No. 2010-196624 filed Sep. 2, 2010, the contents of all of which are incorporated herein by reference in their entirety.

TECHNICAL FIELD

The present exemplary embodiment relates to a secondary battery, particularly to a lithium ion secondary battery.

BACKGROUND ART

Along with the rapid market expansion of notebook personal computers, cell phones, electric cars and the like, high-energy density secondary batteries are in demand. Means of obtaining high-energy density secondary batteries include a method of using a large-capacity negative electrode material, and a method of using a nonaqueous electrolyte liquid excellent in stability.

Patent Literature 1 discloses the utilization of an oxide of silicon or a silicate salt for a negative electrode active substance of a secondary battery. Patent Literature 2 discloses a negative electrode for a secondary battery having an active substance layer containing a carbon material particle capable of occluding and releasing lithium ions, a metal particle capable of being alloyed with lithium, and an oxide particle capable of occluding and releasing lithium ions. Patent Literature 3 discloses a negative electrode material for a secondary battery, which is obtained by coating carbon on the surface of a particle having a structure in which microcrystals of silicon are dispersed in a silicon compound.

Patent Literature 4 discloses an electrolyte liquid containing a cyclic oxocarbon anion having the following structure.

[Formula 1]

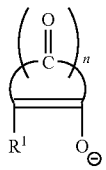

(In the formula, $R^1$ represents one group selected from the group consisting of hydrocarbon groups having 1 to 12 carbon atoms, halogen-substituted hydrocarbon groups, alkoxy groups, thioether groups, amino groups, amide groups and acyl group; and n is an integer of 1 to 6).

CITATION LIST

Patent Literature

Patent Literature 1: JP6-325765A
Patent Literature 2: JP2003-123740A
Patent Literature 3: JP2004-47404A
Patent Literature 4: JP2007-197370A

SUMMARY OF INVENTION

Technical Problem

However, if the secondary battery utilizing an oxide of silicon for its negative electrode active substance, described in Patent Literature 1, is charged and discharged at 45° C. or higher, the reduction in the capacity subject to the charge/discharge cycle becomes remarkably large in some cases.

The negative electrode for a secondary battery described in Patent Literature 2 has an effect of relaxing the volume change of the negative electrode as a whole on occlusion and release of lithium, due to the differences in charge/discharge potential between the three components. However, in Patent Literature 2, there have been some points which have not been sufficiently studied, regarding a relationship among three kinds of components in a state of coexistence, and regarding the binder, an electrolyte liquid, a conformation of an electrode assembly, and an outer packaging body which are indispensable for fabricating a lithium ion secondary battery.

The negative electrode material for a secondary battery described in Patent Literature 3 also has an effect of relaxing the volume change of the negative electrode as a whole. However, in Patent Literature 3, there have been some points which have not been sufficiently studied, regarding a binder, an electrolyte liquid, a conformation of an electrode assembly and an outer packaging body which are indispensable for fabricating a lithium ion secondary battery.

The electrolyte liquid disclosed in Patent document 4 is supposed to have excellent ionic conductivity, but there have been some points which have not been sufficiently studied, regarding an anode active material, a conformation of an electrode assembly, and an outer packaging body which are indispensable for fabricating a lithium ion secondary battery.

Then, an object of the present exemplary embodiment is to provide a secondary battery with higher-performance, particularly to provide a lithium ion secondary battery having low impedance.

Solution to Problem

The present exemplary embodiment is a secondary battery comprising an electrode assembly in which a positive electrode and a negative electrode are arranged to face each other, an electrolyte liquid, and a package accommodating the electrode assembly and the electrolyte liquid, wherein the negative electrode comprises a negative electrode active substance containing at least one selected from a metal (a) capable of being alloyed with lithium and a metal oxide (b) capable of occluding and releasing lithium ions, a negative electrode binder, and a negative electrode current collector; and the electrolyte liquid comprises a sulfide compound.

Advantageous Effects of Invention

In the present exemplary embodiment, use of an electrolyte liquid containing a sulfide compound can reduce the impedance of the battery.

BRIEF DESCRIPTION OF DRAWINGS

FIG. 1 is a schematic cross-sectional diagram showing a structure of an electrode assembly of a secondary battery of a stacked laminate type.

DESCRIPTION OF EMBODIMENTS

Hereinafter, the present exemplary embodiment will be described in detail.

In the secondary battery according to the present exemplary embodiment, an electrode assembly in which a positive electrode and a negative electrode are arranged to face each other, and an electrolyte liquid are accommodated in a package. A shape of the secondary battery may be any type selected from among a cylindrical type, a flat wound rectangular type, a stacked rectangular type, a coin type, a flat wound laminate type and a stacked laminate type, but is preferably a stacked laminate type. Hereinafter, a secondary battery of a stacked laminate type will be described.

FIG. 1 is a schematic cross-sectional diagram showing a structure of an electrode assembly of a secondary battery of a stacked laminate type. The electrode assembly is formed by alternately stacking a plurality of positive electrodes c and a plurality of negative electrodes a with a separator b being interposed therebetween. Respective positive electrode current collectors e which the positive electrodes c have are mutually welded on the end of the each current collector which is not covered with a positive electrode active substance, to be thereby electrically connected, and further a positive electrode terminal f is welded to the welded portion. Respective negative electrode current collectors d which the negative electrodes a have are mutually welded on the end of the each current collector which is not covered with a negative electrode active substance, to be thereby electrically connected, and further a negative electrode terminal g is welded to the welded portion.

Since an electrode assembly having such a planar stacked structure has no portion of a small R (a region near a winding core of a wound structure), an advantage of the electrode assembly is that it is less adversely affected by volume change of the electrode that occurs in the charge/discharge cycle than an electrode assembly having a wound structure. That is, it is useful as an electrode assembly in which an active substance which easily generates volume expansion is used.

[1] Negative Electrode

A negative electrode is formed by binding a negative electrode active substance on the negative electrode current collector with a negative electrode binder.

The negative electrode active substance in the present exemplary embodiment contains at least one selected from a metal (a) capable of being alloyed with lithium, and a metal oxide (b) capable of occluding and releasing lithium ions, and may also contain a carbon material (c) capable of occluding and releasing lithium ions. The negative electrode active substance preferably contains a metal (a) capable of being alloyed with lithium, a metal oxide (b) capable of occluding and releasing lithium ions, and a carbon material (c) capable of occluding and releasing lithium ions.

As metal (a), Al, Si, Pb, Sn, In, Bi, Ag, Ba, Ca, Hg, Pd, Pt, Te, Zn, La, or an alloy of two or more thereof can be used. In particular, it is preferable to contain silicon (Si) as metal (a). Metal (a) can be used singly or concurrently with other substances, but is preferably in the range of 5% by mass or more and 90% by mass or less, and more preferably in the range of 20% by mass or more and 50% by mass or less, in the negative electrode active substance.

As the metal oxide (b), silicon oxide, aluminum oxide, tin oxide, indium oxide, zinc oxide, lithium oxide, or a composite thereof can be used. In particular, it is preferable to contain silicon oxide as metal oxide (b). This is because the silicon oxide is relatively stable and hardly causes reactions with other compounds. To the metal oxide (b), one or two or more elements selected from nitrogen, boron and sulfur may be further added, for example, from 0.1 to 5% by mass. Thereby, the electroconductivity of the metal oxide (b) can be improved. The metal oxide (b) can be used singly or concurrently with other substances, but is preferably in the range of 5% by mass or more and 90% by mass or less, and more preferably in the range of 40% by mass or more and 70% by mass or less, in the negative electrode active substance.

As carbon material (c), graphite, amorphous carbon, diamond-like carbon, carbon nanotubes, or a composite thereof can be used. Here, graphite having a high crystallinity has a high electroconductivity, and has excellent adhesiveness with a positive electrode current collector including a metal such as copper, and excellent voltage flatness. By contrast, since amorphous carbon having a low crystallinity exhibits relatively small volume expansion, the amorphous carbon has a high advantage of relaxing the volume expansion of the negative electrode as a whole, and hardly causes deterioration caused by nonuniformity including crystal grain boundaries and defects. Carbon material (c) is preferably in the range of 2% by mass or more and 80% by mass or less, and more preferably in the range of 2% by mass or more and 30% by mass or less, in the negative electrode active substance.

In the case where the negative electrode active substance contains metal oxide (b), the whole or a part of metal oxide (b) preferably has an amorphous structure. Metal oxide (b) of an amorphous structure can suppress volume expansion of carbon material (c) or metal (a) that are another negative electrode active substances, and can also suppress the decomposition of an electrolyte liquid such as one containing a phosphate compound. This mechanism is not clear, but it is presumed that metal oxide (b) having an amorphous structure has some influence on the film formation at the interface between carbon material (c) and the electrolyte liquid. Also, the amorphous structure is believed to have a relatively small constituent due to nonuniformity such as crystal grain boundary or a defect. The whole or a part of metal oxide (b) having an amorphous structure can be confirmed by X-ray diffractometry (common XRD measurement). Specifically, in the case where metal oxide (b) has no amorphous structure, a peak intrinsic to metal oxide (b) is observed, but in the case where the whole or a part of metal oxide (b) has an amorphous structure, a peak intrinsic to metal oxide (b) is observed as a broad peak.

In the case where the negative electrode active substance contains metal (a) and metal oxide (b), metal oxide (b) is preferably an oxide of a metal constituting metal (a). The whole or a part of metal (a) is preferably dispersed in metal oxide (b). Dispersing at least a part of metal (a) in metal oxide (b) can further suppress the volume expansion of a negative electrode as a whole, and can also suppress the decomposition of an electrolyte liquid. The whole or a part of metal (a) being dispersed in metal oxide (b) can be confirmed by the combined use of the transmission electron microscopic observation (common TEM observation) and the energy dispersive X-ray spectroscopy (common EDX measurement). Specifically, it can be confirmed that the metal constituting the metal particle (a) has not been turned to an oxide of the metal, by observing the cross-section of a sample containing the metal particle (a) and measuring the oxygen concentration of the metal particle (a) dispersed in metal oxide (b).

A negative electrode active substance which contains metal (a), metal oxide (b) and carbon material (c) wherein the whole or a part of metal oxide (b) has an amorphous structure, and the whole or a part of metal (a) is dispersed in metal oxide (b) can be fabricated, for example, by the method disclosed in Patent Literature 3. That is, subjecting metal oxide (b) to a CVD process under an atmosphere containing an organic gas such as methane gas can give a composite in which metal (a) in metal oxide (b) is made into nanoclusters and is covered on the surface with carbon material (c). Alternatively, the negative electrode active substance can be fabricated by mixing carbon material (c), metal (a) and metal oxide (b) by mechanical milling.

Although it is preferable that a negative electrode active substance contains metal (a), metal oxide (b) and carbon material (c) as described above, the proportions of metal (a), metal oxide (b) and the carbon material (c) are not especially limited. The content of metal (a), the content of metal oxide (b) and the content of carbon material (c) with respect to the total of metal (a), metal oxide (b) and carbon oxide (c) are preferably 5% by mass or more and 90% by mass or less, 5% by mass or more and 90% by mass or less, and 2% by mass or more and 80% by mass or less, respectively. Also, the contents of metal (a), the content metal oxide (b) and the content carbon material (c) with respect to the total of metal (a), metal oxide (b) and carbon material (c) are more preferably 20% by mass or more and 50% by mass or less, 40% by mass or more and 70% by mass or less, and 2% by mass or more and 30% by mass or less, respectively.

Metal (a), metal oxide (b) and carbon material (c) that is used can be, but should not be particularly limited to, a particle thereof. For example, the average particle diameter of metal (a) can be constituted to be smaller than the average particle diameters of carbon material (c) and metal oxide (b). With such a constitution, since the particle diameter of metal (a) in which little volume change occurs during the charge/discharge cycle is relatively small and the particle diameters of carbon material (c) and metal oxide (b) in which large volume change occurs are relatively large, the formation of dendrite and the micro-powdering of the alloy can be more effectively suppressed. Lithium is consequently occluded in and released from the large-sized particle, the small-sized particle and the large-sized particle in this order in the charge/discharge process, and also from this point, the generation of the residual stress and the residual strain is suppressed. The average particle diameter of metal (a) can be made to be, for example, 20 μm or smaller, and is preferably made to be 15 μm or smaller.

The average particle diameter of metal oxide (b) is preferably ½ or smaller than that of carbon material (c), and the average particle diameter of metal (a) is preferably ½ or smaller than that of metal oxide (b). It is more preferable that the average particle diameter of metal oxide (b) be ½ or smaller than that of carbon material (c), and the average particle diameter of metal (a) be ½ or smaller than that of metal oxide (b). Controlling the average particle diameters in such ranges can more effectively provide the effect of relaxing the volume expansion of the metal and the alloy phase, and can provide a secondary battery that has excellent balance between energy density, the cycle life and efficiency. More specifically, it is preferable that the average particle diameter of silicon oxide (b) be made to be ½ or smaller than that of graphite (c), and the average particle diameter of silicon (a) be made to be ½ or smaller than that of silicon oxide (b). Still more specifically, the average particle diameter of silicon (a) can be made to be, for example, 20 μm or smaller, and is preferably made to be 15 μm or smaller.

As a negative electrode binder, usable are polyvinylidene fluoride (PVdF), vinylidene fluoride-hexafluoropropylene copolymers, vinylidene fluoride-tetrafluoroethylene copolymers, styrene-butadiene copolymerized rubber, polytetrafluoroethylene, polypropylene, polyethylene, polyimide, polyamideimide, and the like. Above all, polyimide (PI) and polyamideimide (PAI) are preferable because of high bindability. The amount of a negative electrode binder to be used is preferably 5 to 25 parts by mass based on 100 parts by mass of the negative electrode active substance from the viewpoint of a "sufficient binding force" and "increased energy", which are in a tradeoff relationship.

The negative electrode current collector is not especially limited, but is preferably aluminum, nickel, copper, silver, or an alloy thereof in the viewpoint of the electrochemical stability. The shape thereof includes a foil, a plate-shape and a mesh-shape.

The negative electrode can be fabricated by forming a negative electrode active substance layer containing a negative electrode active substance and a negative electrode binder, on the negative electrode current collector. A formation method of the negative electrode active substance layer includes a doctor blade method, a die coater method, a CVD method, and a sputtering method. A negative electrode current collector may be made by forming a negative electrode active substance layer in advance, and thereafter forming a thin film of aluminum, nickel or an alloy thereof by a method such as vapor deposition or sputtering.

[2] Positive Electrode

A positive electrode is constituted, for example, by binding a positive electrode active substance on the positive electrode current collector with a positive electrode binder so as to cover the positive electrode current collector.

The positive electrode active substance includes lithium manganate having a lamellar structure or lithium manganate having a spinel structure such as $LiMnO_2$ and $Li_xMn_2O_4$ ($0<x<2$); $LiCoO_2$, $LiNiO_2$ and materials in which a part of the transition metal thereof are substituted with another metal; lithium transition metal oxides such as $LiNi_{1/3}Co_{1/3}Mn_{1/3}O_2$, in which the molar ratio of a specific transition metal is not more than one half; and materials which have lithium at a larger amount than the stoichiometric amount in these lithium transition metal oxides. Particularly, $Li_\alpha Ni_\beta Co_\gamma Al_\delta O_2$ ($1\leq\alpha\leq1.2$, $\beta+\gamma+\delta=1$, $\beta\geq0.7$, $\gamma\geq0.2$) or $Li_\alpha Ni_\beta Co_\gamma Mn_\delta O_2$ ($1\leq\alpha\leq1.2$, $\beta+\gamma+\delta=1$, $\beta\geq0.6$, $\gamma\leq0.2$) is preferable. The positive electrode active substance can be used singly or in combinations of two or more.

As a positive electrode binder, the same one as the negative electrode binder can be used. Above all, polyvinylidene fluoride is preferable from the viewpoint of versatility and low cost. The amount of a positive electrode binder to be used is preferably 2 to 10 parts by mass based on 100 parts by mass of a positive electrode active substance from the viewpoint of a "sufficient binding force" and "increased energy", which are in a tradeoff relationship.

As the positive electrode current collector, the same one as the negative electrode current collector can be used.

To a positive electrode active substance layer containing a positive electrode active substance, an electroconductive auxiliary material may be added in order to reduce impedance. The electroconductive auxiliary material includes carbonaceous microparticles of graphite, carbon black, acetylene black and the like.

[3] Electrolyte Liquid

An electrolyte liquid used in the present exemplary embodiment contains a sulfide compound. In the present exemplary embodiment, the sulfide compound refers to a compound having a sulfide bond. The sulfide compound contains monosulfide, disulfide or trisulfide. That is, the sulfide compound includes compounds having a sulfide bond composed of a C—S—C structure, and organic compounds having a disulfide bond composed of a C—S—S—C structure.

The sulfide compound is preferably a compound represented by the following general formula (1) or (2).

$$R_1\text{—S—}R_2 \qquad (1)$$

$$R_1\text{—S—S—}R_2 \qquad (2)$$

wherein $R_1$ and $R_2$ each independently denote a substituted or unsubstituted alkyl group, a substituted or unsubstituted aryl group, a substituted or unsubstituted heterocyclic group, a substituted or unsubstituted alkenyl group, or a substituted or unsubstituted alkynyl group.

In $R_1$ and $R_2$ in the above general formulae (1) and (2), the alkyl group is preferably an alkyl group having 1 to 30 carbon atoms in total, more preferably an alkyl group having 1 to 18 carbon atoms in total, and still more preferably an alkyl group having 1 to 12 carbon atoms in total. The aryl group is preferably an aryl group having 6 to 30 carbon atoms in total, more preferably an aryl group having 6 to 18 carbon atoms in total, and still more preferably an aryl group having 6 to 12 carbon atoms in total. The heterocyclic group is preferably a heterocyclic group having 4 to 30 carbon atoms in total, more preferably a heterocyclic group having 4 to 18 carbon atoms in total, and a heterocyclic group having 4 to 12 carbon atoms in total. The alkenyl group is preferably an alkenyl group having 2 to 30 carbon atoms in total, more preferably an alkenyl group having 2 to 18 carbon atoms in total, and still more preferably an alkenyl group having 2 to 12 carbon atoms in total. The alkynyl group is preferably an alkynyl group having 2 to 30 carbon atoms in total, more preferably an alkynyl group having 2 to 18 carbon atoms in total, and still more preferably an alkynyl group having 2 to 12 carbon atoms in total. The alkyl group includes straight-chain alkyl groups, branched-chain alkyl groups and cyclic alkyl groups.

In $R_1$ and $R_2$, the substituent includes at least one selected from the group consisting of alkyl groups, hydroxy group, cycloalkyl groups, alkenyl groups, alkynyl groups, alkoxy groups, alkylcarbonyl groups, arylcarbonyl groups, alkoxycarbonyl groups, aryloxycarbonyl groups, alkylcarbonyloxy groups, arylcarbonyloxy groups, aryl groups, aryloxy groups, alkylthio groups, arylthio groups, alkylthiocarbonyl groups, arylthiocarbonyl groups, alkylsulfinyl groups, arylsulfinyl group, alkylsulfonyl groups, arylsulfonyl groups, heteroatom-containing aromatic cyclic groups, an amino group, a cyano group, silyl groups, a nitro group, and halogen atoms. The number of carbon atoms in total described above is described in the concept including substituents.

These substituents more specifically include, for example, alkyl groups having 1 to 6 carbon atoms (for example, a methyl group, an ethyl group, a propyl group, an isopropyl group, and a butyl group), hydroxy group, cycloalkyl groups having 3 to 6 carbon atoms (for example, a cyclopropyl group, a cyclobutyl group, a cyclopentyl group, and a cyclohexyl group), alkenyl groups having 2 to 6 carbon atoms (for example, a vinyl group, 1-propenyl group, 2-propenyl group, and 2-butenyl group), alkynyl groups having 2 to 6 carbon atoms (for example, an acetylenyl group, 1-propynyl group, 2-propynyl group, and 2-butynyl group), alkoxy groups having 1 to 6 carbon atoms (for example, a methoxy group, an ethoxy group, a n-propoxy group, an iso-propoxy group, a n-butoxy group, and a tert-butoxy group), alkylcarbonyl groups having 2 to 6 carbon atoms, arylcarbonyl groups having 7 to 11 carbon atoms, alkoxycarbonyl groups having 2 to 6 carbon atoms (for example, a methoxycarbonyl group, an ethoxycarbonyl group, and a tert-butoxycarbonyl group), aryloxycarbonyl groups having 7 to 11 carbon atoms, alkylcarbonyloxy groups having 2 to 6 carbon atoms, arylcarbonyloxy groups having 7 to 11 carbon atoms, aryl groups having 6 to 14 carbon atoms (for example, a phenyl group, a naphthyl group, and an anthracenyl group), aryloxy groups having 6 to 10 carbon atoms (for example, a phenoxy group and a naphthoxy group), alkylthio groups having 1 to 6 carbon atoms (for example, a methylthio group, an ethylthio group, a n-propylthio group, an iso-propylthio group, a n-butylthio group, and a tert-butylthio group), arylthio groups having 6 to 10 carbon atoms (for example, a phenylthio group and a naphthylthio group), alkylthiocarbonyl groups having 2 to 6 carbon atoms, arylthiocarbonyl groups having 7 to 11 carbon atoms, alkylsulfinyl groups having 1 to 6 carbon atoms, arylsulfinyl groups having 6 to 10 carbon atoms, alkylsulfonyl groups having 1 to 6 carbon atoms, arylsulfonyl groups having 6 to 10 carbon atoms, heteroatom-containing aromatic cyclic groups having 4 to 8 carbon atoms (for example, a furyl group and a thienyl group), an amino group, a cyano group, silyl groups (for example, a trimethylsilyl group and a triethylsilyl group), a nitro group, and halogen atoms (for example, a chlorine atom, a bromine atom, and a fluorine atom). The silyl group is represented by $—SiR_xR_yR$, wherein $R_x$, $R_y$, and $R_z$ are each independently a hydrogen atom, a halogen atom, or an alkyl group or alkoxy group which has 1 to 6 carbon atoms and may be branched. The silyl group includes, for example, a trimethylsilyl group and a triethylsilyl group.

These substituents may be substituted with a halogen atom, and is preferably substituted with a fluorine atom. The substituents containing a fluorine atom include, for example, fluorine-substituted alkyl groups having 1 to 6 carbon atoms, fluorine-substituted cycloalkyl groups having 3 to 6 carbon atoms, fluorine-substituted alkoxy groups having 1 to 6 carbon atoms, fluorine-substituted alkylcarbonyl groups having 2 to 6 carbon atoms, fluorine-substituted arylcarbonyl groups having 7 to 11 carbon atoms, fluorine-substituted alkoxycarbonyl groups having 2 to 6 carbon atoms, fluorine-substituted aryloxycarbonyl groups having 7 to 11 carbon atoms, fluorine-substituted alkylcarbonyloxy groups having 2 to 6 carbon atoms, fluorine-substituted arylcarbonyloxy groups having 7 to 11 carbon atoms, fluorine-substituted aryl groups having 6 to 14 carbon atoms, fluorine-substituted aryloxy groups having 6 to 10 carbon atoms, fluorine-substituted alkylthio groups having 1 to 6 carbon atoms, fluorine-substituted arylthio groups having 6 to 10 carbon atoms, fluorine-substituted alkylthiocarbonyl groups having 2 to 6 carbon atoms, fluorine-substituted arylthiocarbonyl groups having 7 to 11 carbon atoms, fluorine-substituted alkylsulfinyl groups having 1 to 6 carbon atoms, fluorine-substituted arylsulfinyl groups having 6 to 10 carbon atoms, fluorine-substituted alkylsulfonyl groups having 1 to 6 carbon atoms, and fluorine-substituted arylsulfonyl groups having 6 to 10 carbon atoms. The substituent containing a fluorine atom preferably includes fluorine-substituted alkyl groups having 1 to 6 carbon atoms, fluorine-substituted cycloalkyl groups having 3 to 6 carbon atoms, fluorine-substituted aryl groups having 6 to 14 carbon atoms, fluorine-substituted alkylthio groups having 1 to 6 carbon atoms, and fluorine-substituted arylthio groups having 6 to 10 carbon atoms. The fluorine-substitution suffices if being the substitution with at least one fluorine atom, and is preferably the substitution of all hydrogen atoms with fluorine atoms.

$R_1$ and $R_2$ may bond with each other directly or through —O—, —S—, —SO—, —SO$_2$—, —NH—, —NR$_3$—, —CO—, —C(=O)O—, —C(=O)NH—, an alkylene group having 1 to 3 carbon atoms or a phenylene group, to form a ring structure. Here, $R_3$ is an alkyl group having 1 to 4 carbon atoms, or an aryl group having 6 to 10 carbon atoms. A compound forming a ring structure by bonding $R_1$ and $R_2$ with each other through —S— includes, for example, 1,3-dithiane.

These sulfide compounds can be used singly or as a mixture of two or more.

In the present exemplary embodiment, the reason why the impedance of the battery is reduced through the use of an electrolyte liquid that contains a sulfide compound is thought to be that the sulfide compound is reduced and decomposed on a negative electrode surface to thereby form a film containing a compound $Li_xS_y$ having a high Li-ion conductivity. The $Li_xS_y$ compound is a solid electrolyte, and has high ionic conductivity and electron conductivity. Therefore, the formation of a film containing the $Li_xS_y$ compound on a negative electrode is presumed to improve the ionic conductivity of the electrode interface and reduce the impedance of the battery.

On the other hand, ether compounds are known as compounds having a similar structure as the sulfide bond. In ether compounds, electrons on the ether oxygen are known to interact with lithium ions, but a compound formed by the reduction and decomposition reaction on a negative electrode is $Li_2O$. $Li_2O$ is a non-conductor, and is poor in ionic conductivity as well as electron conductivity. It is believed that since the foramtion of $Li_2O$ on a negative electrode raises the impedance of a battery, the rate characteristic of a battery is lowered more in the case where an ether compound is used than in the case where a sulfide compound is used. However, the consideration hitherto is just an assumption, and does not limit the present invention.

The content of a sulfide compound is not particularly limited, but is preferably 0.1 to 30% by mass, and more preferably 1 to 20% by mass, with respect to the total amount of a nonaqueous electrolyte solvent and the sulfide compound. Making the content of a sulfide compound 0.1% by mass or more allows effective formation of a film on the negative electrode surface, and allows more effective reduction of the impedance. Since making the content of a sulfide compound 30% by mass or less allows a high content of a nonaqueous electrolyte solvent such as ethylene carbonate or propylene carbonate, and allows the dissolution of a supporting salt in a high concentration, depletion of the electrolyte liquid can be prevented.

The sulfide compound is preferably a fluorinated sulfide compound having a fluorine atom(s), and is preferably a fluorinated sulfide compound represented by the following general formula (3).

$$R_3\text{—}S\text{—}R_4 \quad (3)$$

wherein $R_3$ and $R_4$ each independently denote an alkyl group substituted with at least one fluorine atom and having 1 to 6 carbon atoms in total, or an aryl group substituted with at least one fluorine atom and having 6 to 10 carbon atoms in total.

The alkyl group substituted with at least one fluorine atom and having 1 to 6 carbon atoms in total includes straight-chain alkyl groups, branched-chain alkyl groups and cyclic alkyl groups.

All hydrogen atoms of $R_3$ and $R_4$ are preferably substituted with fluorine atoms, and such groups include, for example, a trifluoromethyl group, a perfluoroethyl group, a perfluoropropyl group, a perfluorobutyl group and a perfluorophenyl group.

Use of a fluorinated sulfide compound is assumed to allow formation of a better film. This is because the film (SEI) that is formed on a negative electrode surface and contains fluorine provides higher hydrophobicity (water-repellency) than films containing no fluorine. It is believed that since an electrolyte liquid having a high permittivity is thereby prevented from directly contacting the silicon negative electrode, decomposition of the electrolyte liquid can be suppressed.

The electrolyte liquid generally contains a nonaqueous electrolyte solvent other than a sulfide compound. The nonaqueous electrolyte solvent is not especially limited, but includes aprotic organic solvents including, for example, cyclic-type carbonates such as propylene carbonate (PC), ethylene carbonate (EC), butylene carbonate (BC) and vinylene carbonate (VC); linear-type carbonates such as dimethyl carbonate (DMC), diethyl carbonate (DEC), ethyl methyl carbonate (EMC) and dipropyl carbonate (DPC); propylene carbonate derivatives; and aliphatic carboxylate esters such as methyl formate, methyl acetate and ethyl propionate. The nonaqueous electrolyte solvent is preferably cyclic-type or linear-type carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC) and dipropyl carbonate (DPC). The nonaqueous electrolyte solvent can be used singly or in combinations of two or more.

The electrolyte liquid further contains a supporting salt. The supporting salt includes lithium salts including, for example, $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting salts can be used singly or in combinations of two or more.

[4] Separator

As a separator, porous films or non-woven fabrics of polypropylene, polyethylene or the like can be used. As the separator, laminated ones thereof can also be used.

[5] Package

A package is arbitrarily selected as long as it is stable against an electrolyte liquid, and has a sufficient water vapor barrier property. For example, in the case of a secondary battery of a stacked laminate type, as the package, a laminate film of polypropylene, polyethylene or the like coated with aluminum or silica can be used. Particularly, an aluminum laminate film is preferably used from the viewpoint of suppressing volume expansion.

In the case of a secondary battery in which a laminate film is used as a package, when gas is generated, distortion of the electrode assembly becomes much larger than in the case of a secondary battery in which a metal can is used as a package. This is because the laminate film is more liable to be deformed due to the internal pressure of the secondary battery than the metal can. Further, in the case of the secondary battery in which a laminate film is used as a package, when it is sealed, the inner pressure of the battery is generally set to be lower than atmospheric pressure. Thus, the battery does not have extra space, which can easily and directly cause a volume change of the battery and deformation of the electrode assembly when gas is generated.

However, in the secondary battery according to the present exemplary embodiment, the above-mentioned problem can be overcome. Thereby, a lithium ion secondary battery of a stacked laminate type can be provided which is inexpensive and in which there is more broad latitude to change cell capacity by altering the stacking number.

EXAMPLES

Hereinafter, the present exemplary embodiment will be described specifically by way of Examples.

Example 1

A silicon of 5 μm in average particle diameter as metal (a), an amorphous silicon oxide ($SiO_x$, $0<x\le2$) of 13 μm in average particle diameter as metal oxide (b), and a graphite of 30 μm in average particle diameter as carbon material (c) were weighed in a mass ratio of 29:61:10. Then, these materials were mixed for 24 hours by so-called mechanical milling to thereby obtain a negative electrode active substance. In the negative electrode active substance, the silicon that is metal (a) was dispersed in the silicon oxide ($SiO_x$, $0<x\leq2$) that is metal oxide (b).

The negative electrode active substance (average particle diameter: $D_{50}=5$ μm) and a polyimide (made by UBE Industries, Ltd., trade name: U Varnish A) as a negative electrode binder were weighed in a mass ratio of 80:20, and mixed with n-methylpyrrolidone to thereby prepare a negative electrode slurry. The negative electrode slurry was applied to a copper foil having a thickness of 10 μm, thereafter dried, and further subjected to thermal treatment at 300° C. under a nitrogen atmosphere to thereby fabricate a negative electrode. In Table 1, the content (%) of a negative electrode binder indicates the content (% by mass) of the negative electrode binder with respect to the negative electrode active substance and the negative electrode binder.

Lithium nickelate ($LiNi_{0.80}Co_{0.15}Al_{0.15}O_2$) as a positive electrode active substance, carbon black as an electroconductive auxiliary material, and polyvinylidene fluoride as a positive electrode binder were weighed in a mass ratio of 90:5:5. Then, these materials were mixed with n-methylpyrrolidone to thereby prepare a positive electrode slurry. The positive electrode slurry was applied to an aluminum foil having a thickness of 20 μm, thereafter dried, and further pressed to thereby fabricate a positive electrode.

Three layers of the obtained positive electrode and four layers of the obtained negative electrode were alternately stacked with a polypropylene porous film as a separator being interposed therebetween. Ends of the positive electrode current collectors which were not covered with the positive electrode active substance, and ends of the negative electrode current collectors which were not covered with the negative electrode active substance were each welded. Further to the respective welded portions, a positive electrode terminal made of aluminum and a negative electrode terminal made of nickel were respectively welded to thereby obtain an electrode assembly having a planar stacked structure.

On the other hand, chloromethyl methyl sulfide as a sulfide compound and a carbonate nonaqueous electrolyte solvent were mixed in a proportion of 20 parts by mass and 80 parts by mass, respectively, to thereby prepare a mixed solution. $LiPF_6$ as a supporting salt was further dissolved in a concentration of 1 mol/l in the mixed solution to thereby prepare an electrolyte liquid. The carbonate nonaqueous electrolyte solvent used was a mixed solvent of EC/PC/DMC/EMC/DEC=20/20/20/20/20 (volume ratio). In Table 1, a sulfide content (%) indicates the content (% by mass) of a sulfide compound with respect to the sulfide compound and the carbonate nonaqueous electrolyte solvent.

The electrode assembly was packed with an aluminum laminate film as a package; and the electrolyte liquid was injected in the interior, and sealed while the pressure was reduced to 0.1 atm, to thereby fabricate a secondary battery.

<Evaluations>
(20° C. Cycle)
A test of repeating charge/discharge in the voltage range from 2.5 V to 4.1 V in a constant-temperature bath held at 20° C. was carried out on the fabricated secondary battery to thereby evaluate the maintenance rate (%) and the swelling (%). The results are shown in Table 1. In Table 1, the "maintenance rate (%)" represents (a discharge capacity at 150th cycle)/(a discharge capacity at the first cycle)×100 (unit: %). The "swelling (volume increase) (%)" represents {(a volume at 150th cycle)/(a volume at the first cycle)−1}×100(%) (unit: %).

(60° C. Cycle)
A test of repeating charge/discharge in the voltage range from 2.5 V to 4.1 V in a constant-temperature bath held at 60° C. was carried out on the fabricated secondary battery to thereby evaluate the maintenance rate (%) and the swelling (%). The results are shown in Table 1. In Table 1, the "maintenance rate (%)" represents (a discharge capacity at 50th cycle)/(a discharge capacity at the first cycle)×100 (unit: %). The "swelling (volume increase) (%)" represents {(a volume at 50th cycle)/(a volume at the first cycle)−1}×100(%) (unit: %).

(3C-Rate Characteristic)
The 3C rate properties of the fabricated secondary batteries were evaluated. The evaluation was carried out as follows. First, the battery charged to full charge was discharged at a 1C-rate (60-min discharge) to 2.5 V to evaluate the discharge capacity. Then, the battery was again charged to full charge, and thereafter discharged at a 3C-rate (at a current value three times that of the 1C-rate; 20-min discharge) to 2.5 V to evaluate the discharge capacity. Then, the maintenance rate (%) was determined from the acquired 3C-discharge capacity and 1C-discharge capacity. The results are shown in Table 1.

In Table 1, the "maintenance rate (%)" represents (a 3C-discharge capacity)/(a 1C-discharge capacity)×100(%) (unit: %).

Examples 2 to 114

Secondary batteries were fabricated and evaluated in the same manner as in Example 1, except that the mass ratios of the silicon, the silicon oxide and the graphite, the kinds and the contents of the negative electrode binders, and the kinds and the contents of the sulfide compounds were selected as shown in Tables 1 to 6. The results are shown in Tables 1 to 6. In Tables, PI indicates polyimide; PAI, polyimideamide; and PVdF, polyvinylidene fluoride.

Example 115

According to the method described in Patent Literature 3, a negative electrode active substance was obtained which contained a silicon, an amorphous silicon oxide ($SiO_x$, $0<x\leq2$), and a carbon in a mass ratio of 29:61:10. In the negative electrode active substance, the silicon as metal (a) was dispersed in the amorphous silicon oxide as metal oxide (b). Then, the present Example was carried out in the same manner as Example 1, except that this negative electrode active substance was used. The results are shown in Table 6.

Example 116

The present Example was carried out in the same manner as Example 28, except that the negative electrode active substance described in Example 115 was used. The results are shown in Table 6.

Example 117

The present Example was carried out in the same manner as Example 58, except that the negative electrode active substance described in Example 115 was used. The results are shown in Table 6.

Example 118

The present Example was carried out in the same manner as Example 60, except that the negative electrode active substance described in Example 115 was used. The results are shown in Table 6.

Comparative Examples 1 to 11

Secondary batteries were fabricated and evaluated in the same manner as Example 1, except that the mass ratios of the silicon, the silicon oxide and the graphite, and the kinds and the contents of the negative electrode binders were selected as shown in Table 7 and except for not using a sulfide compound. The results are shown in Table 7.

Comparative Examples 12 to 17

Secondary batteries were fabricated and evaluated in the same manner as Example 1, except that ether compounds described in Table 8 were used in place of the sulfide compounds and the kinds of negative electrode binders were selected as shown in Table 8. The results are shown in Table 8. In Table 8, the content of an ether compound indicates the content (% by mass) of the ether compound with respect to the total amount of the ether compound and the carbonate non-aqueous electrolyte solvent.

TABLE 1

| | | Negative Electrode Binder | | | Sulfide | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|---|
| | Si/SiO/C Ratio | Kind | Content (%) | Sulfide Compound | Content (%) | Maintenance Rate (%) | Judgment | Swelling <Volume> (%) | Judgment | Maintenance Rate (%) | Judgment | Swelling <Volume> (%) | Judgment | (%) | Judgment |
| Example 1 | 29/61/10 | PI | 20 | chloromethyl methyl sulfide | 20 | 80 | ○ | 2 | ○ | 70 | ○ | 10 | ○ | 50 | ○ |
| Example 2 | 29/61/10 | PAI | 20 | 2-chloroethyl phenyl sulfide | 20 | 78 | ○ | 3 | ○ | 68 | ○ | 12 | ○ | 48 | ○ |
| Example 3 | 29/61/10 | PI | 5 | 2-bromoethyl phenyl sulfide | 10 | 62 | ○ | 6 | ○ | 51 | ○ | 13 | ○ | 46 | ○ |
| Example 4 | 29/61/10 | PI | 5 | 2-chloroethyl methyl sulfide | 10 | 63 | ○ | 6 | ○ | 52 | ○ | 18 | ○ | 47 | ○ |
| Example 5 | 29/61/10 | PI | 5 | 4-bromothioanisole | 5 | 62 | ○ | 3 | ○ | 53 | ○ | 12 | ○ | 46 | ○ |
| Example 6 | 29/61/10 | PI | 5 | 4-tert-butyl phenyl sulfide | 5 | 59 | ○ | 3 | ○ | 52 | ○ | 13 | ○ | 45 | ○ |
| Example 7 | 29/61/10 | PI | 25 | acetyl sulfide | 10 | 65 | ○ | 6 | ○ | 58 | ○ | 15 | ○ | 51 | ○ |
| Example 8 | 29/61/10 | PI | 25 | allyl methyl sulfide | 5 | 67 | ○ | 6 | ○ | 57 | ○ | 15 | ○ | 50 | ○ |
| Example 9 | 29/61/10 | PI | 25 | allyl phenyl sulfide | 5 | 75 | ○ | 3 | ○ | 62 | ○ | 12 | ○ | 48 | ○ |
| Example 10 | 29/61/10 | PI | 25 | allyl propyl sulfide | 5 | 70 | ○ | 3 | ○ | 61 | ○ | 12 | ○ | 47 | ○ |
| Example 11 | 29/61/10 | PI | 25 | diallyl sulfide | 5 | 71 | ○ | 3 | ○ | 71 | ○ | 13 | ○ | 46 | ○ |
| Example 12 | 29/61/10 | PI | 25 | amyl methyl sulfide | 10 | 75 | ○ | 4 | ○ | 78 | ○ | 12 | ○ | 45 | ○ |
| Example 13 | 29/61/10 | PI | 25 | diamyl sulfide | 10 | 74 | ○ | 2 | ○ | 74 | ○ | 14 | ○ | 47 | ○ |
| Example 14 | 29/61/10 | PI | 25 | benzyl chloromethyl sulfide | 5 | 80 | ○ | 3 | ○ | 69 | ○ | 14 | ○ | 50 | ○ |
| Example 15 | 29/61/10 | PI | 25 | benzyl methyl sulfide | 5 | 76 | ○ | 2 | ○ | 80 | ○ | 13 | ○ | 50 | ○ |
| Example 16 | 29/61/10 | PI | 25 | dibenzyl sulfide | 5 | 77 | ○ | 4 | ○ | 82 | ○ | 11 | ○ | 52 | ○ |
| Example 17 | 29/61/10 | PI | 25 | (phenylthio)acetonitrile | 10 | 81 | ○ | 3 | ○ | 76 | ○ | 15 | ○ | 52 | ○ |
| Example 18 | 29/61/10 | PI | 25 | (phenylthiomethyl)trimethylsilane | 10 | 74 | ○ | 3 | ○ | 75 | ○ | 14 | ○ | 51 | ○ |
| Example 19 | 29/61/10 | PI | 25 | 1,1-bis(methylthio)-2-nitroethylene | 5 | 68 | ○ | 4 | ○ | 80 | ○ | 15 | ○ | 49 | ○ |
| Example 20 | 29/61/10 | PI | 25 | 1,1-bis(methylthio)ethylene | 5 | 70 | ○ | 2 | ○ | 82 | ○ | 16 | ○ | 47 | ○ |

TABLE 2

| | | Negative Electrode Binder | | | Sulfide | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|---|
| | Si/SiO/C Ratio | Kind | Content (%) | Sulfide Compound | Content (%) | Maintenance Rate (%) | Judgment | Swelling <Volume> (%) | Judgment | Maintenance Rate (%) | Judgment | Swelling <Volume> (%) | Judgment | (%) | Judgment |
| Example 21 | 29/61/10 | PI | 25 | 1'3-bis(methylthio)-2-methoxypropane | 10 | 72 | ○ | 4 | ○ | 77 | ○ | 14 | ○ | 49 | ○ |
| Example 22 | 29/61/10 | PI | 25 | bis(methylthio)(trimethylsilyl)methane | 5 | 72 | ○ | 2 | ○ | 74 | ○ | 15 | ○ | 51 | ○ |
| Example 23 | 29/61/10 | PI | 25 | bis(phenylthio)methane | 5 | 71 | ○ | 3 | ○ | 76 | ○ | 18 | ○ | 50 | ○ |
| Example 24 | 29/61/10 | PI | 25 | chloromethyl p-tolyl sulfide | 5 | 68 | ○ | 4 | ○ | 80 | ○ | 14 | ○ | 51 | ○ |
| Example 25 | 29/61/10 | PI | 25 | dodecyl methyl sulfide | 10 | 69 | ○ | 3 | ○ | 77 | ○ | 14 | ○ | 52 | ○ |

TABLE 2-continued

| | Negative Electrode Binder | | | Sulfide | | 20° C. Cycle (150 cyc) | | | | 60° C. Cycle (50 cyc) | | | | 3C-Rate Characteristic 3C/1C <Discharge Capacity> | |
| | | | | | | Maintenance Rate | | Swelling <Volume> | | Maintenance Rate | | Swelling <Volume> | | | |
| | Si/SiO/C Ratio | Kind | Content (%) | Sulfide Compound | Content (%) | (%) | Judgment | (%) | Judgment | (%) | Judgment | (%) | Judgment | (%) | Judgment |
|---|---|---|---|---|---|---|---|---|---|---|---|---|---|---|---|
| Example 26 | 29/61/10 | PI | 25 | ethyl (phenylthio)acetate | 10 | 70 | ○ | 3 | ○ | 76 | ○ | 16 | ○ | 50 | ○ |
| Example 27 | 29/61/10 | PI | 25 | methoxymethyl phenyl sulfide | 5 | 71 | ○ | 2 | ○ | 75 | ○ | 14 | ○ | 48 | ○ |
| Example 28 | 29/61/10 | PI | 25 | diphenyl sulfide | 5 | 75 | ○ | 2 | ○ | 72 | ○ | 14 | ○ | 47 | ○ |
| Example 29 | 29/61/10 | PI | 25 | dihexyl sulfide | 10 | 77 | ○ | 4 | ○ | 73 | ○ | 16 | ○ | 51 | ○ |
| Example 30 | 29/61/10 | PI | 25 | methyl p-tolyl sulfide | 10 | 73 | ○ | 2 | ○ | 81 | ○ | 14 | ○ | 46 | ○ |
| Example 31 | 29/61/10 | PI | 25 | phenyl vinyl sulfide | 5 | 75 | ○ | 3 | ○ | 77 | ○ | 12 | ⊙ | 47 | ○ |
| Example 32 | 29/61/10 | PI | 25 | furfuryl methyl sulfide | 10 | 74 | ○ | 3 | ○ | 74 | ○ | 14 | ⊙ | 46 | ○ |
| Example 33 | 29/61/10 | PI | 25 | tert-butyl methyl sulfide | 20 | 72 | ○ | 4 | ○ | 75 | ○ | 15 | ○ | 45 | ○ |
| Example 34 | 29/61/10 | PI | 25 | cyclopropyl phenyl sulfide | 10 | 71 | ○ | 4 | ○ | 74 | ○ | 14 | ○ | 50 | ○ |
| Example 35 | 29/61/10 | PI | 25 | 2-chloroethyl ethyl sulfide | 20 | 80 | ○ | 3 | ○ | 77 | ○ | 14 | ○ | 51 | ○ |
| Example 36 | 29/61/10 | PI | 25 | 2,2-dichlorocyclopropyl phenyl sulfide | 5 | 81 | ○ | 5 | ○ | 82 | ○ | 16 | ○ | 48 | ○ |
| Example 37 | 29/61/10 | PI | 25 | benzyl phenyl sulfide | 10 | 73 | ○ | 3 | ○ | 72 | ○ | 14 | ○ | 47 | ○ |
| Example 38 | 29/61/10 | PI | 25 | di(n-octadecyl) disulfide | 20 | 78 | ○ | 2 | ○ | 83 | ○ | 15 | ○ | 46 | ○ |
| Example 39 | 29/61/10 | PI | 25 | difurfuryl sulfide | 10 | 76 | ○ | 4 | ○ | 80 | ○ | 16 | ○ | 45 | ○ |

TABLE 3

| | Negative Electrode Binder | | | Sulfide | | 20° C. Cycle (150 cyc) | | | | 60° C. Cycle (50 cyc) | | | | 3C-Rate Characteristic 3C/1C <Discharge Capacity> | |
| | | | | | | Maintenance Rate | | Swelling <Volume> | | Maintenance Rate | | Swelling <Volume> | | | |
| | Si/SiO/C Ratio | Kind | Content (%) | Sulfide Compound | Content (%) | (%) | Judgment | (%) | Judgment | (%) | Judgment | (%) | Judgment | (%) | Judgment |
|---|---|---|---|---|---|---|---|---|---|---|---|---|---|---|---|
| Example 40 | 29/61/10 | PI | 25 | di(n-octyl) sulfide | 10 | 79 | ○ | 4 | ○ | 77 | ○ | 14 | ○ | 50 | ○ |
| Example 41 | 29/61/10 | PI | 25 | didecyl sulfide | 20 | 82 | ○ | 2 | ○ | 76 | ○ | 14 | ○ | 52 | ○ |
| Example 42 | 29/61/10 | PI | 25 | di(n-dodecyl) sulfide | 10 | 75 | ○ | 4 | ○ | 78 | ○ | 12 | ○ | 49 | ○ |
| Example 43 | 29/61/10 | PI | 25 | 2-bromoethyl phenyl sulfide | 5 | 76 | ○ | 2 | ○ | 83 | ○ | 12 | ○ | 51 | ○ |
| Example 44 | 29/61/10 | PI | 25 | diisopropyl sulfide | 10 | 77 | ○ | 5 | ○ | 88 | ○ | 13 | ○ | 49 | ○ |
| Example 45 | 29/61/10 | PI | 25 | n-butyl ethyl sulfide | 20 | 74 | ○ | 4 | ○ | 78 | ○ | 14 | ○ | 47 | ○ |
| Example 46 | 29/61/10 | PI | 25 | furfuryl isopropyl sulfide | 10 | 73 | ○ | 3 | ○ | 80 | ○ | 15 | ○ | 49 | ○ |
| Example 47 | 29/61/10 | PI | 25 | heptyl methyl sulfide | 20 | 72 | ○ | 3 | ○ | 79 | ○ | 14 | ○ | 51 | ○ |
| Example 48 | 29/61/10 | PI | 25 | diheptyl sulfide | 20 | 82 | ○ | 3 | ○ | 77 | ○ | 15 | ○ | 50 | ○ |
| Example 49 | 29/61/10 | PI | 25 | 4-nitrophenyl phenyl sulfide | 5 | 83 | ○ | 4 | ○ | 76 | ○ | 16 | ○ | 51 | ○ |
| Example 50 | 29/61/10 | PI | 25 | cyclohexyl methyl sulfide | 10 | 77 | ○ | 3 | ○ | 81 | ○ | 17 | ○ | 50 | ○ |
| Example 51 | 29/61/10 | PI | 25 | cyclopropyl phenyl sulfide | 5 | 74 | ○ | 2 | ○ | 82 | ○ | 14 | ○ | 48 | ○ |
| Example 52 | 29/61/10 | PI | 25 | p-bromophenyl methyl sulfide | 5 | 75 | ○ | 2 | ○ | 76 | ○ | 14 | ○ | 47 | ○ |
| Example 53 | 29/61/10 | PI | 25 | dipropyl sulfide | 20 | 77 | ○ | 3 | ○ | 77 | ○ | 16 | ○ | 50 | ○ |
| Example 54 | 29/61/10 | PI | 25 | decyl methyl sulfide | 20 | 80 | ○ | 2 | ○ | 78 | ○ | 15 | ○ | 48 | ○ |
| Example 55 | 29/61/10 | PI | 25 | 1,3-dithiane | 20 | 82 | ○ | 2 | ○ | 76 | ○ | 14 | ○ | 52 | ○ |
| Example 56 | 29/61/10 | PI | 25 | 2-trimethylsilyl-1,3-dithiane | 10 | 77 | ○ | 3 | ○ | 81 | ○ | 17 | ○ | 50 | ○ |
| Example 57 | 29/61/10 | PI | 25 | isobutylene sulfide | 20 | 78 | ○ | 3 | ○ | 68 | ○ | 12 | ○ | 47 | ○ |
| Example 58 | 29/61/10 | PI | 25 | benzyl trifluoromethyl sulfide | 10 | 81 | ○ | 5 | ○ | 76 | ○ | 5 | ⊙ | 47 | ○ |
| Example 59 | 29/61/10 | PI | 25 | bis(3-fluorophenyl) disulfide | 5 | 82 | ○ | 3 | ○ | 72 | ○ | 4 | ⊙ | 50 | ○ |

TABLE 4

| | Negative Electrode Binder | | | Sulfide | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|
| | | | | | Maintenance Rate | | Swelling <Volume> | | Maintenance Rate | | Swelling <Volume> | | | |
| | Si/SiO/C Ratio | Kind | Content (%) | Sulfide Compound | Content (%) | (%) | Judgment | (%) | Judgment | (%) | Judgment | (%) | Judgment | (%) | Judgment |
| Example 60 | 29/61/10 | PI | 25 | trifluoromethyl phenyl sulfide | 5 | 82 | ○ | 5 | ○ | 80 | ○ | 5 | ⊙ | 52 | ○ |
| Example 61 | 29/61/10 | PI | 20 | fluoromethyl methyl sulfide | 20 | 80 | ○ | 2 | ○ | 70 | ○ | 6 | ⊙ | 46 | ○ |
| Example 62 | 29/61/10 | PI | 5 | perfluoroethyl methyl sulfide | 10 | 52 | ○ | 3 | ○ | 51 | ○ | 4 | ⊙ | 46 | ○ |
| Example 63 | 29/61/10 | PI | 25 | perfluoroethyl ethyl sulfide | 10 | 80 | ○ | 3 | ○ | 78 | ○ | 6 | ⊙ | 50 | ○ |
| Example 64 | 29/61/10 | PAI | 20 | 2-fluoroethyl phenyl sulfide | 20 | 78 | ○ | 3 | ○ | 68 | ○ | 5 | ⊙ | 47 | ○ |
| Example 65 | 29/61/10 | PI | 5 | perfluoroethyl phenyl sulfide | 10 | 67 | ○ | 2 | ○ | 65 | ○ | 7 | ⊙ | 47 | ○ |
| Example 66 | 29/61/10 | PI | 5 | 4-fluorophenyl methyl sulfide | 10 | 53 | ○ | 2 | ○ | 52 | ○ | 6 | ⊙ | 45 | ○ |
| Example 67 | 29/61/10 | PI | 5 | (4-tert-butylphenyl) 4-fluorophenyl sulfide | 5 | 52 | ○ | 3 | ○ | 53 | ○ | 7 | ⊙ | 51 | ○ |
| Example 68 | 29/61/10 | PI | 25 | amyl trifluoromethyl sulfide | 5 | 75 | ○ | 3 | ○ | 62 | ○ | 6 | ⊙ | 46 | ○ |
| Example 69 | 29/61/10 | PI | 25 | benzyl fluoromethyl sulfide | 5 | 70 | ○ | 3 | ○ | 61 | ○ | 6 | ⊙ | 45 | ○ |
| Example 70 | 29/61/10 | PI | 20 | benzyl trifluoromethyl sulfide | 5 | 80 | ○ | 4 | ○ | 78 | ○ | 5 | ⊙ | 47 | ○ |
| Example 71 | 29/61/10 | PI | 20 | (4-fluorophenylthio) acetonitrile | 10 | 78 | ○ | 2 | ○ | 76 | ○ | 5 | ⊙ | 50 | ○ |
| Example 72 | 29/61/10 | PI | 20 | (phenylthiomethyl) trimethylsilane | 10 | 52 | ○ | 3 | ○ | 50 | ○ | 4 | ⊙ | 50 | ○ |
| Example 73 | 29/61/10 | PI | 25 | 1,3-bis(trifluoromethylthio)-2-methoxypropane | 5 | 55 | ○ | 2 | ○ | 53 | ○ | 4 | ⊙ | 51 | ○ |
| Example 74 | 29/61/10 | PI | 25 | bis(trifluoromethylthio) (trimethylsilyl) methane | 10 | 65 | ○ | 4 | ○ | 63 | ○ | 5 | ⊙ | 49 | ○ |
| Example 75 | 29/61/10 | PI | 25 | bis(4-fluorophenylthio) methane | 10 | 67 | ○ | 2 | ○ | 65 | ○ | 6 | ⊙ | 47 | ○ |
| Example 76 | 29/61/10 | PI | 25 | trifluoromethyl (4-methylphenyl)sulfide | 5 | 75 | ○ | 2 | ○ | 73 | ○ | 4 | ⊙ | 49 | ○ |
| Example 77 | 29/61/10 | PI | 25 | dodecyl trifluoromethyl sulfide | 5 | 70 | ○ | 3 | ○ | 68 | ○ | 3 | ⊙ | 51 | ○ |
| Example 78 | 29/61/10 | PI | 25 | ethyl (perfluorophenylthio) acetate | 10 | 67 | ○ | 4 | ○ | 65 | ○ | 4 | ⊙ | 50 | ○ |
| Example 79 | 29/61/10 | PI | 25 | 4-methoxyphenyl (4-fluorophenyl) sulfide | 5 | 66 | ○ | 2 | ○ | 64 | ○ | 5 | ⊙ | 51 | ○ |

TABLE 5

| | Negative Electrode Binder | | | Sulfide | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|
| | | | | | Maintenance Rate | | Swelling <Volume> | | Maintenance Rate | | Swelling <Volume> | | | |
| | Si/SiO/C Ratio | Kind | Content (%) | Sulfide Compound | Content (%) | (%) | Judgment | (%) | Judgment | (%) | Judgment | (%) | Judgment | (%) | Judgment |
| Example 80 | 29/61/10 | PI | 25 | di(4-fluorophenyl) sulfide | 5 | 68 | ○ | 3 | ○ | 65 | ○ | 4 | ⊙ | 52 | ○ |
| Example 81 | 29/61/10 | PI | 25 | 4-tert-butyl perfluorophenyl sulfide | 5 | 70 | ○ | 3 | ○ | 68 | ○ | 4 | ⊙ | 50 | ○ |
| Example 82 | 29/61/10 | PI | 25 | di(perfluorohexyl) sulfide | 10 | 72 | ○ | 4 | ○ | 68 | ○ | 3 | ⊙ | 48 | ○ |
| Example 83 | 29/61/10 | PI | 25 | benzyl trifluoromethyl sulfide | 10 | 68 | ○ | 5 | ○ | 66 | ○ | 4 | ⊙ | 47 | ○ |
| Example 84 | 29/61/10 | PI | 25 | trifluoromethyl 4-trifluoromethylphenyl sulfide | 5 | 69 | ○ | 1 | ○ | 67 | ○ | 3 | ⊙ | 50 | ○ |
| Example 85 | 29/61/10 | PI | 25 | perfluorophenyl trifluoromethyl sulfide | 5 | 72 | ○ | 2 | ○ | 72 | ○ | 2 | ⊙ | 48 | ○ |
| Example 86 | 29/61/10 | PI | 25 | furfuryl trifluoromethyl sulfide | 5 | 75 | ○ | 2 | ○ | 73 | ○ | 5 | ⊙ | 46 | ○ |
| Example 87 | 29/61/10 | PI | 25 | tert-butyl fluoromethyl sulfide | 10 | 77 | ○ | 2 | ○ | 75 | ○ | 4 | ⊙ | 47 | ○ |
| Example 88 | 29/61/10 | PI | 25 | tert-butyl trifluoromethyl sulfide | 10 | 74 | ○ | 1 | ○ | 72 | ○ | 3 | ⊙ | 46 | ○ |
| Example 89 | 29/61/10 | PI | 25 | tert-butyl pentafluoroethyl sulfide | 5 | 68 | ○ | 1 | ○ | 65 | ○ | 3 | ⊙ | 52 | ○ |
| Example 90 | 29/61/10 | PI | 25 | 4-fluorophenyl trifluoromethyl sulfide | 10 | 76 | ○ | 2 | ○ | 74 | ○ | 5 | ⊙ | 45 | ○ |
| Example 91 | 29/61/10 | PI | 25 | cyclopropyl 4-fluorophenyl sulfide | 5 | 77 | ○ | 2 | ○ | 75 | ○ | 4 | ⊙ | 52 | ○ |
| Example 92 | 29/61/10 | PI | 25 | 2,2-difluorocyclopropyl phenyl sulfide | 20 | 82 | ○ | 3 | ○ | 80 | ○ | 5 | ⊙ | 48 | ○ |
| Example 93 | 29/61/10 | PI | 25 | benzyl perfluorophenyl sulfide | 10 | 69 | ○ | 2 | ○ | 67 | ○ | 4 | ⊙ | 47 | ○ |

TABLE 5-continued

| | Negative Electrode Binder | | | Sulfide Compound | Sulfide Content (%) | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|---|
| | Si/SiO/C Ratio | Kind | Content (%) | | | Maintenance Rate (%) | Judgment | Swelling <Volume> (%) | Judgment | Maintenance Rate (%) | Judgment | Swelling <Volume> (%) | Judgment | (%) | Judgment |
| Example 94 | 29/61/10 | PI | 25 | bis(3-fluorophenyl) disulfide | 20 | 68 | ○ | 1 | ○ | 66 | ○ | 2 | ⊙ | 45 | ○ |
| Example 95 | 29/61/10 | PI | 25 | 2-fluoroethyl phenyl sulfide | 5 | 67 | ○ | 3 | ○ | 65 | ○ | 4 | ⊙ | 47 | ○ |
| Example 96 | 29/61/10 | PI | 25 | 3-fluorophenyl pentafluoroethyl sulfide | 10 | 80 | ○ | 3 | ○ | 77 | ○ | 5 | ⊙ | 51 | ○ |
| Example 97 | 29/61/10 | PI | 25 | n-butyl trifluoromethyl sulfide | 5 | 68 | ○ | 3 | ○ | 65 | ○ | 5 | ⊙ | 52 | ○ |
| Example 98 | 29/61/10 | PI | 25 | n-butyl pentafluoroethyl sulfide | 20 | 77 | ○ | 2 | ○ | 75 | ○ | 3 | ⊙ | 50 | ○ |
| Example 99 | 29/61/10 | PI | 25 | heptyl trifluoromethyl sulfide | 10 | 76 | ○ | 3 | ○ | 74 | ○ | 4 | ⊙ | 52 | ○ |

TABLE 6

| | Negative Electrode Binder | | | Sulfide Compound | Sulfide Content (%) | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|---|
| | Si/SiO/C Ratio | Kind | Content (%) | | | Maintenance Rate (%) | Judgment | Swelling <Volume> (%) | Judgment | Maintenance Rate (%) | Judgment | Swelling <Volume> (%) | Judgment | (%) | Judgment |
| Example 100 | 29/61/10 | PI | 25 | 4-nitrophenyl (4-fluorophenyl) sulfide | 10 | 82 | ○ | 4 | ○ | 82 | ○ | 3 | ⊙ | 52 | ○ |
| Example 101 | 29/61/10 | PI | 25 | trifluoromethyl phenyl sulfide | 10 | 84 | ○ | 2 | ○ | 82 | ○ | 2 | ⊙ | 51 | ○ |
| Example 102 | 29/61/10 | PI | 25 | cyclohexyl trifluoromethyl sulfide | 20 | 77 | ○ | 5 | ○ | 76 | ○ | 5 | ⊙ | 50 | ○ |
| Example 103 | 29/61/10 | PI | 25 | cyclopropyl (4-fluorophenyl) sulfide | 5 | 80 | ○ | 2 | ○ | 78 | ○ | 4 | ⊙ | 48 | ○ |
| Example 104 | 29/61/10 | PI | 25 | 3-fluorophenyl trifluoromethyl sulfide | 10 | 81 | ○ | 5 | ○ | 79 | ○ | 5 | ⊙ | 47 | ○ |
| Example 105 | 29/61/10 | PI | 25 | cyclopropyl (4-fluorophenyl) sulfide | 5 | 82 | ○ | 5 | ○ | 80 | ○ | 6 | ⊙ | 46 | ○ |
| Example 106 | 29/61/10 | PI | 25 | 3-fluorophenyl methyl sulfide | 5 | 77 | ○ | 4 | ○ | 75 | ○ | 5 | ⊙ | 46 | ○ |
| Example 107 | 29/61/10 | PI | 25 | cyclopropyl (4-fluorophenyl) sulfide | 10 | 76 | ○ | 4 | ○ | 74 | ○ | 4 | ⊙ | 47 | ○ |
| Example 108 | 29/61/10 | PI | 25 | 4-fluorophenyl methyl sulfide | 20 | 74 | ○ | 3 | ○ | 72 | ○ | 3 | ⊙ | 50 | ○ |
| Example 109 | 29/61/10 | PI | 25 | trifluoromethyl 4-chlorophenyl sulfide | 10 | 80 | ○ | 4 | ○ | 77 | ○ | 4 | ⊙ | 51 | ○ |
| Example 110 | 29/61/10 | PI | 25 | phenyl trifluoromethyl sulfide | 10 | 72 | ○ | 4 | ○ | 68 | ○ | 4 | ⊙ | 48 | ○ |
| Example 111 | 30/0/70 | PVdF | 5 | tert-butyl methyl sulfide | 5 | 77 | ○ | 4 | ○ | 75 | ○ | 4 | ⊙ | 52 | ○ |
| Example 112 | 0/30/70 | PVdF | 5 | tert-butyl methyl sulfide | 10 | 76 | ○ | 2 | ○ | 74 | ○ | 3 | ⊙ | 47 | ○ |
| Example 113 | 30/0/70 | PVdF | 5 | phenyl trifluoromethyl sulfide | 10 | 67 | ○ | 2 | ○ | 65 | ○ | 2 | ⊙ | 47 | ○ |
| Example 114 | 0/30/70 | PVdF | 5 | phenyl trifluoromethyl sulfide | 10 | 76 | ○ | 5 | ○ | 74 | ○ | 5 | ⊙ | 45 | ○ |
| Example 115 | 29/61/10 | PI | 20 | chloromethyl methyl sulfide | 20 | 81 | ○ | 2 | ○ | 71 | ○ | 11 | ○ | 50 | ○ |
| Example 116 | 29/61/10 | PI | 25 | diphenyl sulfide | 5 | 79 | ○ | 2 | ○ | 73 | ○ | 13 | ○ | 47 | ○ |
| Example 117 | 29/61/10 | PI | 25 | benzyl trifluoromethyl sulfide | 10 | 80 | ○ | 3 | ○ | 77 | ○ | 4 | ⊙ | 49 | ○ |
| Example 118 | 29/61/10 | PI | 25 | trifluoromethyl phenyl sulfide | 5 | 83 | ○ | 3 | ○ | 81 | ○ | 5 | ⊙ | 51 | ○ |

TABLE 7

| | Negative Electrode | | | Sulfide Compound | Sulfide Content (%) | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|---|
| | | Binder | | | | Maintenance Rate | | Swelling <Volume> | | Maintenance Rate | | Swelling <Volume> | | | |
| | Si/SiO/C Ratio | Kind | Content (%) | | | (%) | Judgment | (%) | Judgment | (%) | Judgment | (%) | Judgment | (%) | Judgment |
| Comparative Example 1 | 29/61/10 | PVdF | 25 | none | 0 | 47 | X | 15 | X | 41 | X | 25 | X | 32 | X |

TABLE 7-continued

| | Negative Electrode | | | Sulfide | 20° C. Cycle (150 cyc) | | | | 60° C. Cycle (50 cyc) | | | | 3C-Rate Characteristic 3C/1C | |
|---|---|---|---|---|---|---|---|---|---|---|---|---|---|---|
| | | Binder | | | Maintenance Rate | | Swelling <Volume> | | Maintenance Rate | | Swelling <Volume> | | <Discharge Capacity> | |
| | Si/SiO/C Ratio | Kind | Content (%) | Sulfide Compound | Content (%) | (%) | Judgment | (%) | Judgment | (%) | Judgment | (%) | Judgment | (%) | Judgment |
| Comparative Example 2 | 100/0/0 | PI | 25 | none | 0 | 44 | X | 15 | X | 38 | X | 22 | X | 29 | X |
| Comparative Example 3 | 0/100/0 | PI | 25 | none | 0 | 46 | X | 13 | X | 40 | X | 23 | X | 21 | X |
| Comparative Example 4 | 32/68/0 | PI | 25 | none | 0 | 47 | X | 18 | X | 41 | X | 22 | X | 26 | X |
| Comparative Example 5 | 90/0/10 | PI | 25 | none | 0 | 41 | X | 15 | X | 35 | X | 25 | X | 19 | X |
| Comparative Example 6 | 29/61/10 | PI | 25 | none | 0 | 43 | X | 16 | X | 37 | X | 25 | X | 31 | X |
| Comparative Example 7 | 100/0/0 | PAI | 25 | none | 0 | 44 | X | 16 | X | 38 | X | 26 | X | 26 | X |
| Comparative Example 8 | 0/100/0 | PAI | 25 | none | 0 | 46 | X | 14 | X | 40 | X | 23 | X | 24 | X |
| Comparative Example 9 | 32/68/0 | PAI | 25 | none | 0 | 44 | X | 14 | X | 38 | X | 24 | X | 26 | X |
| Comparative Example 10 | 90/0/10 | PAI | 25 | none | 0 | 43 | X | 14 | X | 37 | X | 25 | X | 18 | X |
| Comparative Example 11 | 29/61/10 | PAI | 25 | none | 0 | 42 | X | 15 | X | 36 | X | 25 | X | 30 | X |

TABLE 8

| | Negative Electrode Binder | | | | Content (%) of Ether Compound | 20° C. Cycle (150 cyc) | | | | 60° C. Cycle (50 cyc) | | | | 3C-Rate Characteristic 3C/1C <Discharge Capacity> | |
|---|---|---|---|---|---|---|---|---|---|---|---|---|---|---|---|
| | | | | | | Maintenance Rate | | Swelling <Volume> | | Maintenance Rate | | Swelling <Volume> | | | |
| | Si/SiO/C Ratio | Kind | Content (%) | Ether Compound | | (%) | Judgment | (%) | Judgment | (%) | Judgment | (%) | Judgment | (%) | Judgment |
| Comparative Example 12 | 29/61/10 | PI | 20 | chloromethyl methyl ether | 20 | 43 | X | 5 | ○ | 40 | X | 15 | ○ | 30 | X |
| Comparative Example 13 | 29/61/10 | PAI | 20 | chloromethyl methyl ether | 20 | 42 | X | 5 | ○ | 39 | X | 12 | ○ | 30 | X |
| Comparative Example 14 | 29/61/10 | PI | 20 | 4-bromoanisole | 5 | 41 | X | 3 | ○ | 42 | X | 13 | ○ | 28 | X |
| Comparative Example 15 | 29/61/10 | PAI | 20 | 4-bromoanisole | 5 | 44 | X | 8 | ○ | 43 | X | 12 | ○ | 27 | X |
| Comparative Example 16 | 29/61/10 | PI | 20 | dihexyl ether | 10 | 45 | X | 5 | ○ | 37 | X | 15 | ○ | 21 | X |
| Comparative Example 17 | 29/61/10 | PAI | 20 | dihexyl ether | 10 | 46 | X | 6 | ○ | 39 | X | 15 | ○ | 31 | X |

The present application claims the priority to Japanese Patent Application No. 2010-196624, filed on Sep. 2, 2010, the disclosure of which is incorporated herein by reference in its entirety.

Hitherto, the invention of the present application has been described with reference to the exemplary embodiment and Examples, but the invention of the present application is not limited to the above-mentioned exemplary embodiment and Examples. In the constitutions and details of the invention of the present application, various changes which are understood by a person skilled in the art can be made within the scope of the invention.

INDUSTRIAL APPLICABILITY

The present exemplary embodiment can be utilized in every industrial field necessitating an electric power source, and industrial fields related to transportation, storage, and supply of electric energy. Specifically, the present exemplary embodiment can be utilized in electric power sources for mobile devices such as cell phones and notebook personal computers; electric power sources for movement and transportation media including electric vehicles such as electric cars, hybrid cars, electric motorbikes and electric assist bicycles, and electric trains, satellites and submarines; backup electric power sources such as UPS; electric power storage facilities to store electric power generated by photovoltaic power generation, wind power generation and the like; and the like.

REFERENCE SIGNS LIST a negative electrode
b separator
c positive electrode
d negative electrode current collector e positive electrode current collector
f positive electrode terminal
g negative electrode terminal

What is claimed is:

1. A secondary battery, comprising an electrode assembly in which a positive electrode and a negative electrode are arranged to face each other, an electrolyte liquid, and a package accommodating the electrode assembly and the electrolyte liquid,
wherein the negative electrode is formed by binding a negative electrode active substance containing at least one selected from a metal (a) capable of being alloyed with lithium, and a metal oxide (b) capable of occluding and releasing lithium ions, to a negative electrode current collector with a negative electrode binder, and
the electrolyte liquid comprises a sulfide compound;
wherein the sulfide compound is represented by general formula (1):

$$R_1S\text{—}R_2 \qquad (1)$$

wherein $R_1$ and $R_2$ each independently denote a substituted or unsubstituted alkyl group, a substituted or unsubstituted aryl group, a substituted or unsubstituted heterocyclic group, a substituted or unsubstituted alkenyl group, or a substituted or unsubstituted alkynyl group; and
wherein the sulfide compound comprises a fluorine atom.

2. The secondary battery according to claim 1, wherein a content of the sulfide compound is 0.1 to 30% by mass with respect to the total amount of the sulfide compound and a nonaqueous electrolyte solvent contained in the electrolyte liquid.

3. The secondary battery according to claim 1, wherein the negative electrode active substance further comprises a carbon material (c) capable of occluding and releasing lithium ions.

4. The secondary battery according to claim 1, wherein the negative electrode active substance comprises at least the metal oxide (b).

5. The secondary battery according to claim 4, wherein the whole or a part of the metal oxide (b) has an amorphous structure.

6. The secondary battery according to claim 1, wherein the negative electrode active substance comprises at least the metal (a).

7. The secondary battery according to claim 6, wherein the metal (a) is silicon.

8. The secondary battery according to claim 1,
wherein the negative electrode active substance comprises the metal (a) and the metal oxide (b), and
the metal oxide (b) is an oxide of a metal constituting the metal (a).

9. The secondary battery according to claim 1,
wherein the negative electrode active substance comprises the metal (a) and the metal oxide (b), and
the whole or a part of the metal (a) is dispersed in the metal oxide (b).

10. The secondary battery according to claim 1, wherein the negative electrode binder is polyimide or polyamideimide.

11. The secondary battery according to claim 1, wherein the electrode assembly has a planar stacked structure.

12. The secondary battery according to claim 1, wherein the package is an aluminum laminate film.

13. The secondary battery according to claim 1, wherein a content of the sulfide compound is 0.1 to 30% by mass with respect to the total amount of the sulfide compound and a nonaqueous electrolyte solvent contained in the electrolyte liquid.

14. The secondary battery according to claim 1, wherein the negative electrode active substance comprises the metal (a) and the metal oxide (b), and further comprises a carbon material (c) capable of occluding and releasing lithium ions, and
the metal (a) is silicon, and the metal oxide (b) is silicon oxide, and the whole or a part of the metal (a) is dispersed in the metal oxide (b).

15. The secondary battery according to claim 1, wherein the negative electrode active substance comprises the metal (a) and the metal oxide (b), and further comprises a carbon material (c) capable of occluding and releasing lithium ions, and
the metal (a) is silicon, and the metal oxide (b) is silicon oxide, and the whole or a part of the metal (a) is dispersed in the metal oxide (b).

* * * * *

UNITED STATES PATENT AND TRADEMARK OFFICE
CERTIFICATE OF CORRECTION

PATENT NO. : 9,077,045 B2  
APPLICATION NO. : 13/820239  
DATED : July 7, 2015  
INVENTOR(S) : Masahiro Suguro et al.

Page 1 of 1

It is certified that error appears in the above-identified patent and that said Letters Patent is hereby corrected as shown below:

In the Specification

Column 8, Line 14: Delete "$SiR_xR_yR,$" and insert -- $SiR_xR_yR_z$ --

In the Claims

Column 23, Line 21: In Claim 1, delete "$R_1S—R_2$" and insert -- $R_1—S—R_2$ --

Signed and Sealed this  
Second Day of February, 2016

Michelle K. Lee  
*Director of the United States Patent and Trademark Office*